United States Patent [19]
Whelpley et al.

[11] Patent Number: 5,374,025
[45] Date of Patent: Dec. 20, 1994

[54] FLUIDIC VIBRATION CANCELLATION ACTUATOR AND METHOD

[75] Inventors: Gordon E. Whelpley, Chandler; John F. Thurston, Mesa, both of Ariz.

[73] Assignee: AlliedSignal Inc., Morris Township, Morris County, N.J.

[21] Appl. No.: 83,734

[22] Filed: Jun. 28, 1993

[51] Int. Cl.5 ............................................ F16M 13/00
[52] U.S. Cl. ..................................... 248/550; 188/378; 267/136; 248/566
[58] Field of Search ............... 248/550, 566, 631, 638; 137/833; 188/378; 267/136, 140.14

[56] References Cited

U.S. PATENT DOCUMENTS

| | | |
|---|---|---|
| 2,964,272 | 12/1960 | Olson . |
| 3,216,679 | 11/1965 | Curwen . |
| 3,606,233 | 9/1971 | Scharton et al. . |
| 3,701,499 | 9/1972 | Schubert et al. . |
| 4,033,541 | 7/1977 | Malueg . |
| 4,336,917 | 6/1982 | Phillips . |
| 4,363,377 | 12/1982 | Van Gerpen . |
| 4,483,425 | 11/1984 | Newman ........................... 188/378 |
| 4,546,960 | 10/1985 | Abrams et al. . |
| 4,757,980 | 7/1988 | Schubert . |
| 4,795,123 | 1/1989 | Forward et al. ................ 188/378 X |
| 4,802,648 | 2/1989 | Decker et al. . |
| 4,828,234 | 5/1989 | Hoying et al. . |
| 4,874,016 | 10/1989 | Tseng . |
| 4,930,357 | 6/1990 | Thurston et al. . |
| 4,950,966 | 8/1990 | Moulds, III ................... 267/136 X |
| 5,049,795 | 9/1991 | Moulds, III ................... 267/136 X |
| 5,052,529 | 10/1991 | Sutcliffe et al. ..................... 188/378 |
| 5,101,929 | 4/1992 | Tobias ............................. 248/562 X |
| 5,127,622 | 7/1992 | Whelpley et al. . |
| 5,251,863 | 10/1993 | Gossman et al. ................... 240/550 |
| 5,255,764 | 10/1993 | Kurabayashi et al. ......... 267/136 X |
| 5,285,995 | 2/1994 | Gonzalez et al. .................. 248/550 |

Primary Examiner—Karen J. Chotkowski
Attorney, Agent, or Firm—Jerry J. Holden; Robert A. Walsh

[57] ABSTRACT

A vibration cancellation system having a fluidic driver providing fluid pressure differential and flow to an actuator having a reaction mass. The pressure differential drives the reaction mass so that the actuator's oscillations cancel any vibrations emanating from a vibrating structure mounted thereto.

9 Claims, 3 Drawing Sheets

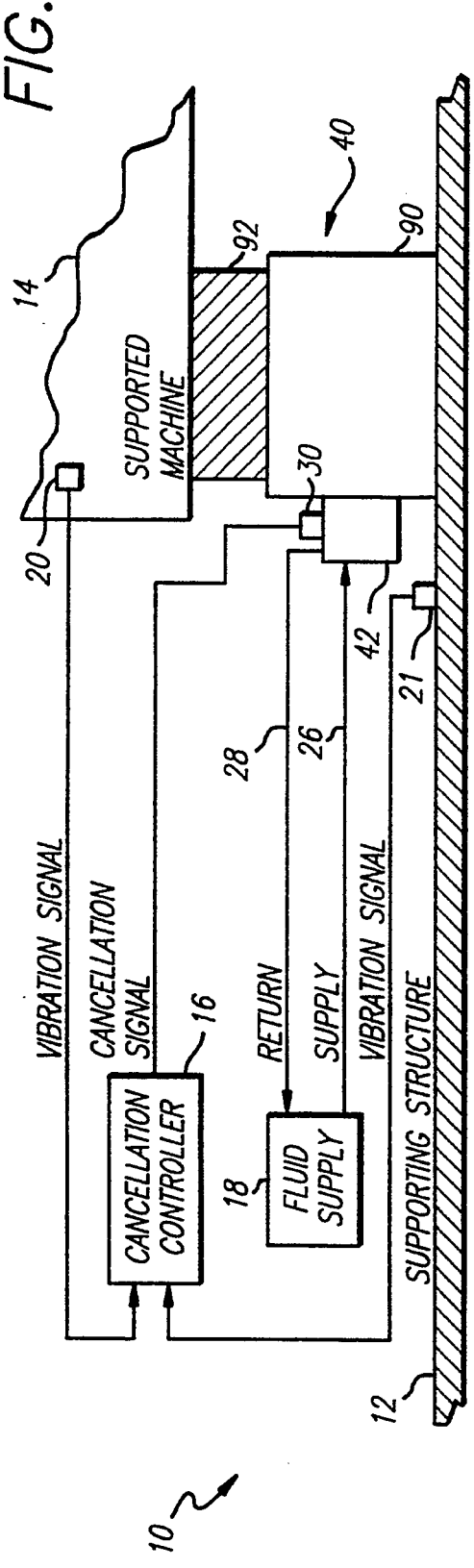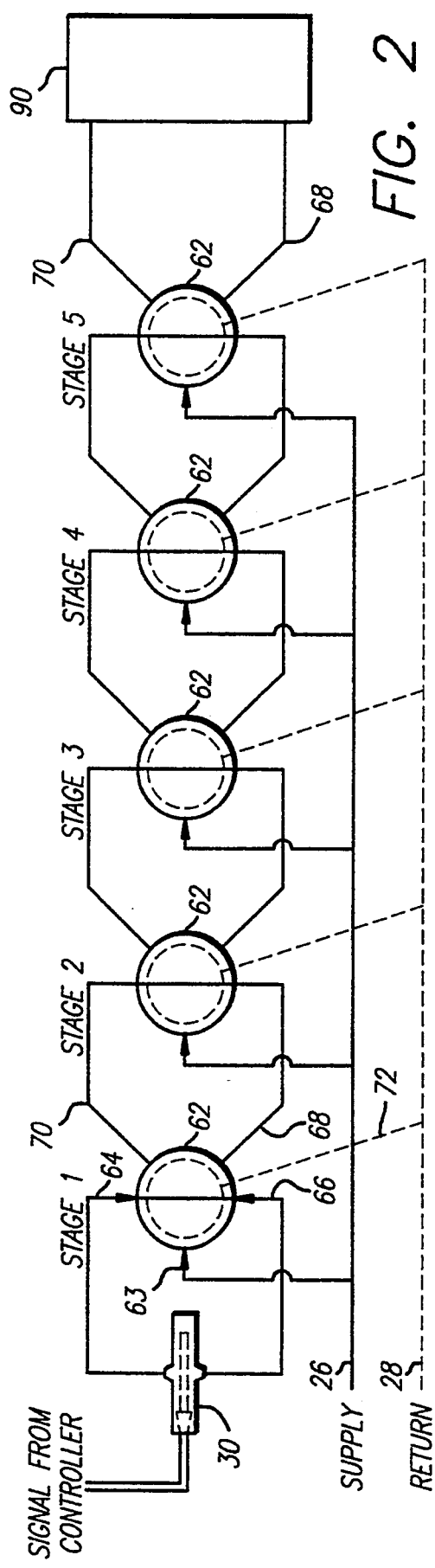

FIG. 4
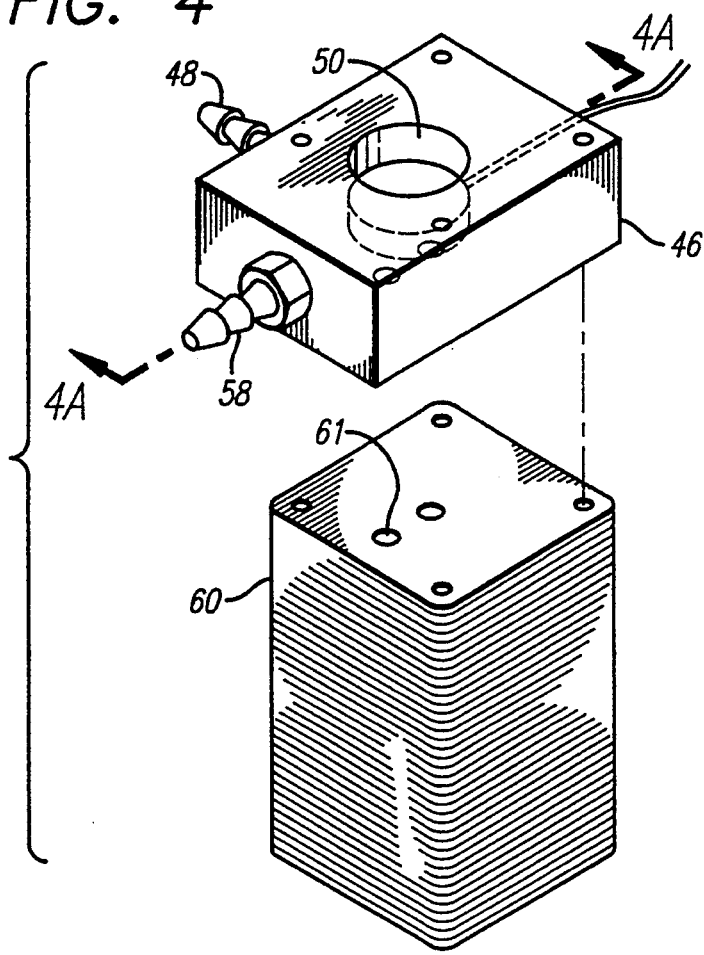
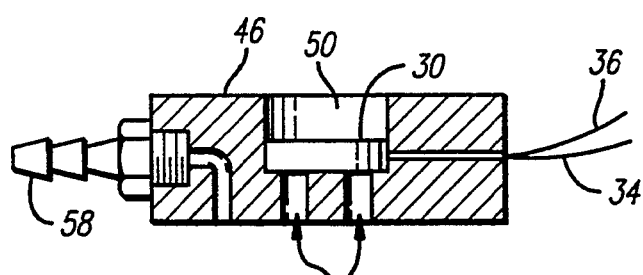
FIG. 4A
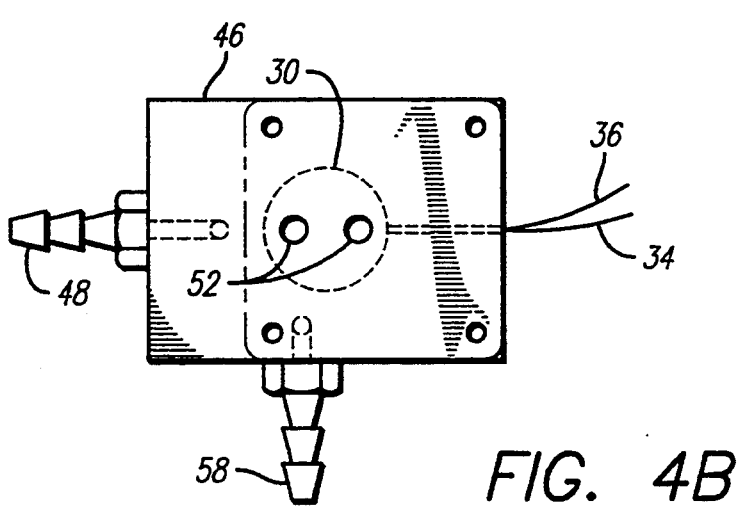
FIG. 4B

FLUIDIC VIBRATION CANCELLATION ACTUATOR AND METHOD

TECHNICAL FIELD

The present invention relates generally to an apparatus and method for isolating vibrating structures and in particular, to a vibration cancellation mount and method that comprises a fluidic driver providing fluid pressure and flow to a reaction mass so that the mass oscillates at a frequency and phase that cancels the vibrations emanating from the vibrating structure mounted thereto. By employing a fluidic driver, the vibration cancellation mount does not suffer from high distortion when subjected to frequencies substantially higher than 100 Hz.

BACKGROUND OF THE INVENTION

Olson, U.S. Pat. No. 2,964,272 discloses the basic concept behind vibration cancellation systems. Olson discloses a system comprised of a driving element, a vibration sensing element and an electrical signal amplifier. The sensing element senses the vibration of a structure and converts the vibration to an electrical signal which is then sent to the amplifier. The amplifier amplifies this signal which operates the driver. The driver, which is mounted between the vibrating structure and a static structure, converts the signal from the amplifier into a mechanical force. By adjusting the phase of the signal coming from the amplifier the driver can be operated so as to counteract the vibration emanating from the structure.

Over the years various forms and types of vibration cancellation systems have been suggested and employed in a variety of applications.

Boothe, U.S. Pat. No. 3,189,303 discloses an active mount for supporting heavy machinery comprised of a pneumatic container or air spring for supporting a load, and a system for supplying air to the container in accordance with the force applied thereto by the load. The pneumatic system utilizes an air source for supplying air to a first valve which is positioned to be actuatable by the force of the load and designed to produce a pressure which is proportional to the force of the load. Air from the first regulator is directed through a stabilizing zone to a second valve and from the second valve, the air is delivered to the air spring.

Curwen, U.S. Pat. No. 3,216,679 discloses an active vibration isolator comprised of a vertically displaceable piston disposed within a cylinder and having means for receiving a load. A valve controls the flow of gas into the cylinder so as to move the piston vertically in response to the load.

Scharton et al., U.S. Pat. No. 3,606,233 discloses a combined active and passive isolation mount wherein the active portion includes a piston, coupled to the vibration sources via a piston rod, adapted for movement within a cylinder to which the isolated mass is mechanically coupled. The piston separates two chambers within the cylinder. The system provides isolation by using a servovalve to control the relative pressure between the chambers in such a manner that the velocity of the cylinder counteracts the velocity of the piston.

Schubert et al., U.S. Pat. No. discloses an active isolation system that includes a servovalve controlled hydraulic actuator to cancel vibrations.

Malueg, U.S. Pat. No. 4,033,541 discloses a system that uses linear actuators to stabilize sensitive apparatus from translational and rotational vibrations emanating from the structure on which the apparatus is mounted.

Phillips, U.S. Pat. No. 4,336,917 discloses a shock and vibration isolation system having a plurality of isolators. Each isolator has two gas driven pistons connected to an accumulator/controller that supplies controlled amounts of air. The flow of gas into the accumulator/controller is governed by a valve.

Van Gerpen, U.S. Pat. No. 4,363,377 discloses an active seat suspension control system in which a hydraulic cylinder is coupled to the seat. A source of pressurized fluid to the cylinder allows the vertical position of the seat to be adjusted. The amount of gas flow into the cylinder is governed by an electrohydraulic valve.

Abrams et al., U.S. Pat. No. 4,546,960 discloses a vibration isolation assembly which includes a servovalve in operative communication between a fluid supply source, a gas supply source and a viscous damper. Control logic means governs the servovalve to adjust both the gas and fluid pressures in the viscous damper in response to sensed vibration so as to attenuate the vibration.

Schubert, U.S. Pat. No. 4,757,980 discloses a vibration isolation system comprising a damper having a servovalve fluidly coupling a load supporting actuator to an accumulator.

Decker et al., U.S. Pat. No. 4,802,648 discloses an engine mount having an air cushion which functions like a pneumatic spring element and which can be inflated and vented via a valve device.

Hoying et al., U.S. Pat. No. 4,828,234 discloses a hydraulic mount assembly with a self-pumping air bladder. The pressurization of the bladder is controlled by a pneumatic control circuit that includes check valves and shuttle valves.

Each of the arrangements described in the above mentioned patents employs some type of mechanical device such as a valve, servovalve or actuator to transform the amplitude and frequency of an electrical cancelling signal into a mechanical cancelling oscillation having the same frequency and amplitude. Because these devices are comprised of mechanically linked, moving parts, they suffer from high distortion when subjected to high frequency signals, and consequently, are unable to vary the pressure of a fluid fast enough to generate a consistent cancelling signal. Thus for example, the systems in Abrams et al., Scharton et al., Schubert et al., and Malueg all have an upper frequency limit of about 100 Hz.

Accordingly, a need exits for a vibration cancellation mount that can operate at frequencies substantially greater than 100 Hz without suffering from the high distortion experienced by the systems found in the prior art.

The subject inventors have already obtained one patent, Whelpley et al., U.S. Pat. No. 5,127,622, which can operate at high frequencies by coupling a fluidic driver to an elastomeric air spring. The following is another vibration cancellation system that overcomes the limitations of the prior art.

SUMMARY OF THE INVENTION

An object of the present invention is to provide a vibration cancellation system that has a minimum of moving parts.

Another object of the present invention is to provide a vibration cancellation system that is compact and lightweight.

Yet another object of the present invention is to provide a vibration cancellation system that can operate at frequencies substantially greater than 100 Hz.

The present invention achieves the above-stated objects by incorporating within a vibration cancellation system a fluidic driver that provides fluid pressure and flow to a reaction mass so that the mass's oscillations cancel any vibrations emanating from a vibrating structure mounted thereto.

These and other objects, features, and advantages of the present invention are specifically set forth in or will become apparent from the following detailed description of a preferred embodiment of the invention when read in conjunction with the accompanying drawings.

BRIEF DESCRIPTION OF THE DRAWINGS

FIG. 1 is a schematic of a fluidic vibration cancellation actuator system contemplated by the present invention.

FIG. 2 is a fluidic circuit diagram of a fluidic driver of the system in FIG. 1.

FIG. 4 is a exploded view of the fluidic driver of FIG. 2.

FIG. 4A is a cross-sectional view taken along line 4A—4A of FIG. 4.

FIG. 4B is a bottom plan view of the sectional view driver of FIG. 4.

DESCRIPTION OF THE PREFERRED EMBODIMENT

Figure 3:
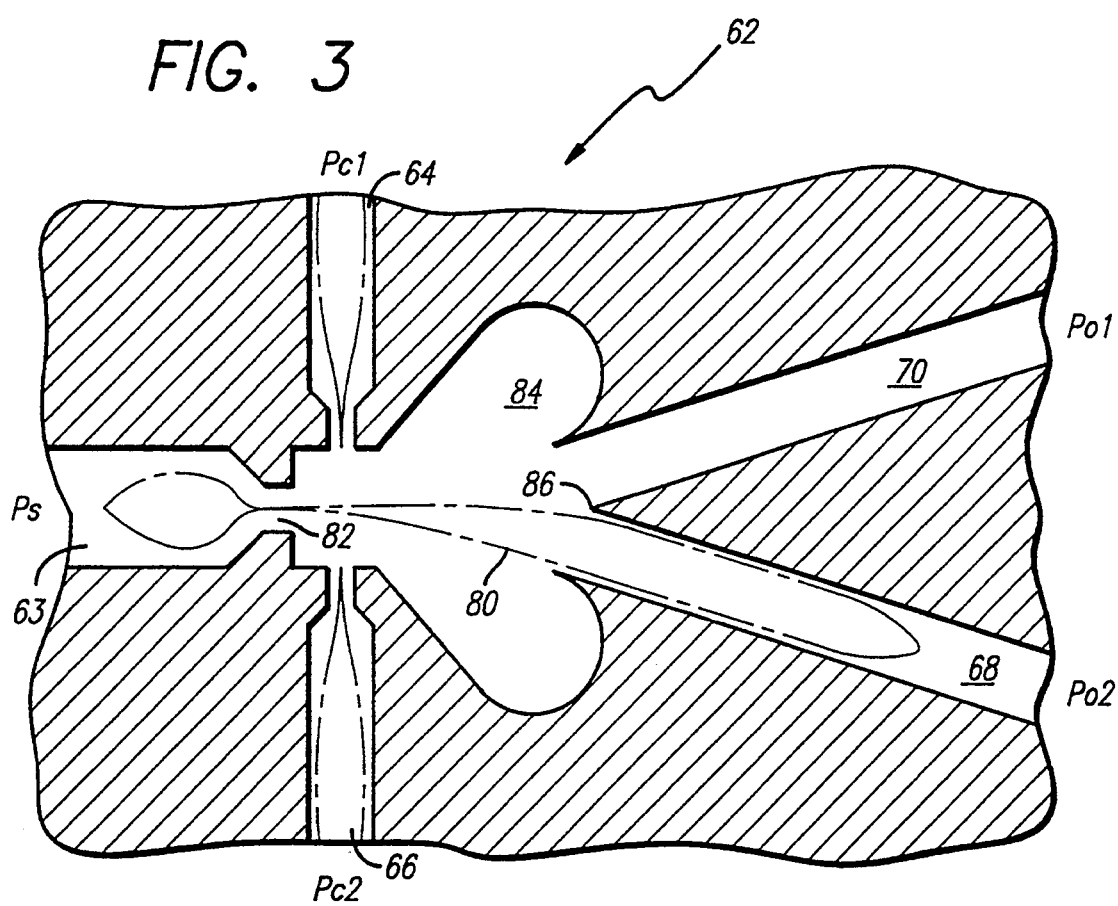
FIG. 3 is a schematic representation in the form of a fluidic lamina of a fluidic amplifier used in the fluidic driver of FIG. 2.

Referring to the drawings, FIG. 1 schematically depicts a vibration cancellation system generally denoted by the reference numeral 10, a supporting structure 12 which is to be isolated from any vibrations emanating from a vibrating supported structure or machine 14. The vibration cancellation system 10 is comprised of a cancellation controller 16, a supply of hydraulic fluid 18, vibration sensors or accelerometers 20 and 21, and a vibration cancellation mount 40 which is operably disposed between the supporting structure 12 and the supported structure 14. The cancellation controller 16 receives electrical vibration signals from the sensor 20 mounted on the vibrating structure 14 and the sensor 21 mounted on the supporting structure 12, preferably, in close proximity to the mount 40. The controller 16 then generates an electrical cancellation signal. For example, if the sensors 20 and 21 detect a sinusoidal vibration, the controller 16 will generate a sinusoidal cancellation signal having an amplitude and phase such that the resulting reaction force of the mount 40 isolates the supporting structure 12 from the dynamics of the vibrating structure 14. The cancellation controller 16 is commercially available and can be purchased from Active Noise and Vibration Technologies, Inc., 3811 East Weir Avenue, Phoenix, Ariz. 85040, or Noise Cancellation Technologies, Inc., 1015 W. Nursery Road, Linthicum, Md. 21090-1203. As a person having ordinary skill in the art would appreciate sensors may vary with different applications and controllers.

The mount 40 is comprised of a fluidic driver 42 coupled to a hydraulic actuator 90. The fluidic driver 42 has a input member 46 mounted atop a stack 60 of fluidic laminae, (see FIG. 4). The member 46 has inlet port 48 coupled to the fluid supply 18 via a supply conduit 26 and an outlet port 58 coupled to the fluid supply 18 via a return conduit 28. A piezoelectric or electromagnetic input transducer 30 is mounted in a chamber 50 within the member 46. The transducer 30 receives a single, electrical cancellation signal from the controller 16 and converts this signal into two, low level hydraulic pressure signals. Because the transducer 30 generates two output signals from a single input signal, it is referred to as a differential output transducer. Inlet conduits 52 place the transducer 30 in fluidic communication with hole 61 in the first lamina of the stack 60. Wires 34 and 36 couple the transducer 30 to the controller 16. An elastomeric isolator 92 is preferably mounted between the actuator 90 and the supported machine 14.

The stack 60 of fluidic laminae is configured and arranged as a plurality of stages 1-5 in series. Each of the stages 1-5 includes one or more fluidic proportional amplifiers 62 in parallel arrangement. In the preferred embodiment, the stack 60 has five stages in series arrangement. The first stage has a single amplifier 62, the second stage has two amplifiers 62 in parallel, the third stage has four amplifiers 62 in parallel, and the fourth and fifth stages each have eight amplifiers 62 in parallel. For clarity FIG. 2 only depicts a single fluidic amplifier in each stage. As one skilled in the art would appreciate, the number of stages and/or the number of fluidic amplifiers must be selected so that the amplitude of the fluidic signals exiting the last stage are sufficient to cancel the vibrations emanating from the vibrating structure 14.

FIG. 2 illustrates the configuration and arrangement of laminae in the stack 60 in the form of a fluidic circuit diagram. For purposes of clarity reference numerals are only indicated for the first stage. Each of the stages 1-5 has a hydraulic fluid supply port 63, a first and second control ports 64 and 66, a first and second output port 68 and 70 and a vent 72. The control ports 64 and 66 receive a first and second signal respectfully from the transducer 30. The output ports 68 and 70 are coupled to the first and second control ports of the next stage, with the final stage having its output ports 68 and 70 in fluid communication with the actuator 90. Within each of the stages the pressure differential in the signals from the transducer 30 are amplified until the differential in pressure between the final output ports 68 and 70 is sufficient to drive the actuator. The vents 72 are in fluid communication with the return conduit 28.

To fully appreciate what occurs within each of the stages 1-5 a typical fluidic proportional amplifier 62 is depicted, schematically in the form of a fluidic lamina in FIG. 3. In the amplifier 62 the supply pressure Ps in the supply port 63 is converted to velocity in the form of a jet of fluid 80 issuing from a nozzle 82. The jet of fluid 80 travels from the exit of the nozzle 82, across a vent region 84, to a splitter 86, and then to the first and second output ports 68 and 70. The first and second control ports, 64 and 66 respectively, are located immediately downstream of the nozzle 82, perpendicular to the jet 80, and opposite each other. The jet 80 is easily deflected laterally by the control pressures Pc1 and Pc2 which are a small fraction of the supply pressure Ps. If the control pressures Pc1 and Pc2 are equal, the jet 80 is not deflected and divides equally at the splitter 86.

The pressures, Po1 and Po2, recovered at each output port 68 and 70 are then the same. If the control pressures Pc1 and Pc2 are unequal, the differential pressure between the two control pressures will cause the jet 80 to deflect away from the control port with the high pressure. Deflection of the jet 80 causes the output port that receives a larger portion of the jet to recover more pressure. The difference in recovered pressure (Po2–Po1) is proportional to the degree of deflection of the jet 80 which is in turn proportional to the difference in control pressures (Pc1–Pc2).

Figure 5:
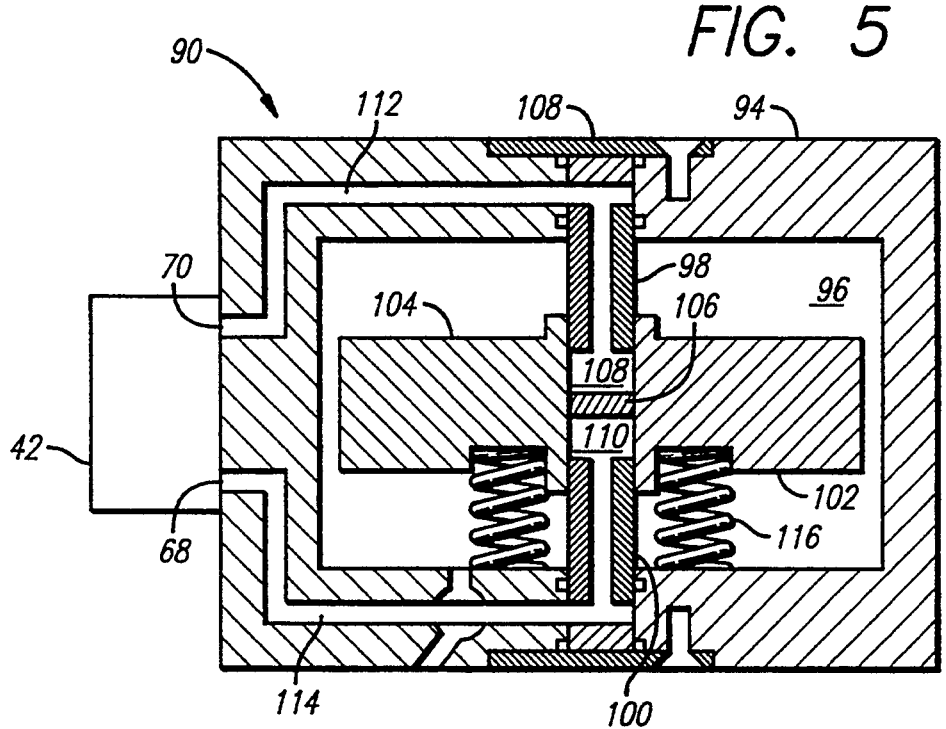
FIG. 5 is an enlarged cross section of the actuator of the system in FIG. 1.

Referring to FIG. 5, the fluidic driver 42 is mounted to the actuator 90. The actuator 90 is comprised of an outer wall 94 encompassing an interior cavity 96. A first and second wall 98, 100 extend from the outer wall 94 partway into the cavity 96 to define two equally sized compartments. The ends of the walls 98, 100 are spaced apart to define a gap. Two equal masses 102, 104 are slideably mounted to the walls 98, 100 so as to close off the open sides of the gap. A third wall 106 is coupled to both masses 102, 104 and extends through the gap to form two equally spaced chambers 108, 110. A flow channel 112 through the outer wall 94 and first wall 98 places the chamber 108 in fluid communication with the final output 70 of the fluidic driver 42. Similarly, a flow channel 114 through the outer wall 94 and second wall 100 places the chamber 110 in fluid communication with the final output 68 of the fluidic driver 42. A helical spring 116 holds the masses 102, 104 in place when at rest.

In operation, the sensors 20 and 21 detect a vibration and transmit a vibration signal to the controller 16. In response, the controller 16 generates a cancellation signal. The transducer 30 receives the cancellation signal and converts it into a differential pressure signal (Pc1–Pc2). This pressure signal is amplified in the fluidic driver 42 resulting in the output pressure differential (Po1–Po2) between output ports 70 and 68. This pressure differential acts across the wall 106 and generates a force that causes the masses 102, 104 to move simultaneously in the same direction, and a reactive force on the spaced apart ends of the walls 98, 100. This reaction force on the outer wall 94 cancels the movement of the supported machine 14.

As the fluidic driver 42 has no mechanically moving parts, it does not suffer from high distortion at frequencies greater than 100 Hz.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A vibration cancellation mount for use in a vibration cancellation system that includes a controller generating an electrical vibration cancellation signal and a fluid supply, comprising;

a transducer electrically coupled to said controller for converting said electrical cancellation signal into a differential cancellation signal, a fluidic driver, in fluid communication with said fluid supply and said transducer, for converting said differential cancellation signal into at least two flows of fluid at different pressures; and an actuator receiving said two flows and actuating in response to said difference in pressure.

2. The vibration cancellation mount of claim 1 further including an elastomeric isolator mounted to said actuator.

3. The vibration cancellation mount of claim 2 wherein said actuator has a reaction mass mounted thereto for oscillating in response to said difference in pressure.

4. The vibration cancellation mount of claim 3 wherein said transducer is a piezoelectric transducer.

5. The vibration cancellation mount of claim 3 wherein said transducer is an electromagnetic transducer.

6. The vibration cancellation mount of claim 1 wherein said fluidic driver includes a plurality of fluidic laminae configured and arranged as a plurality of fluidic proportional amplifier stages in series.

7. The vibration cancellation mount of claim 6 wherein said fluidic laminae has a means for receiving said differential cancellation signal.

8. A vibration cancellation system for isolating a first structure from a vibrating, second structure, comprising;

a fluid supply;

at least one vibration sensor mounted on said vibrating structure;

a controller, electrically coupled to said sensor, for generating a vibration cancellation signal; and a vibration cancellation mount positioned between said first structure and said vibrating structure, said mount comprising a transducer electrically coupled to said controller for converting said cancellation signal into a differential signal, a fluidic driver in fluid communication with said fluid supply and said transducer, for varying the flow rate of fluid synchronously with said differential signal, and an actuator receiving said fluid and reacting synchronously therewith.

9. A method for isolating a first structure supporting a vibrating, second structure comprising the steps of;

measuring the amplitude and frequency of the vibration emanating from said first and second structures;

generating, from the measurements in the preceding step, an electrical, cancelling signal;

converting said electrical signal into a differential signal;

fluidically amplifying said differential signal; and driving an actuator, disposed between said first and second structures, synchronously in response to said amplified differential signal so that said actuator vibrates synchronously with said electrical, cancelling signal.

* * * * *